United States Patent [19]
Ikeda

[11] 3,726,150
[45] Apr. 10, 1973

[54] PULSE RESPONSE-DRIVING APPARATUS

[75] Inventor: Tetsusaburo Ikeda, Tokyo, Japan

[73] Assignee: Iwatsu Electric Co., Ltd., Tokyo, Japan

[22] Filed: Apr. 2, 1971

[21] Appl. No.: 130,706

[30] Foreign Application Priority Data

Apr. 2, 1970 Japan .................................45/29036

[52] U.S. Cl. .................................................74/394
[51] Int. Cl. .............................................F16h 35/02
[58] Field of Search........................74/394, 393, 713

[56] References Cited

UNITED STATES PATENTS

| 3,274,845 | 9/1966 | Moran, Sr. ...............................74/394 |
| 3,548,671 | 12/1970 | Mueller...................................74/394 |
| 3,561,290 | 2/1971 | Ruck......................................74/394 |

FOREIGN PATENTS OR APPLICATIONS 639,835  5/1962  Italy ........................................74/394

Primary Examiner—Leonard H. Gerin
Attorney—Woodcock, Washburn, Kurtz & Mackiewicz

[57] ABSTRACT

A pulse-responsive drive apparatus comprising a first electro-mechanical energy converter responsive to one pulsating signal, a second electro-mechanical energy converter responsive to another pulsating signal, and a combined power transmission mechanism having inputs coupled to the respective mechanical outputs of the converters with the output of the transmission mechanism being the composite of said two mechanical outputs of the first and the second electro-mechanical energy converters respectively whereby an improvement of pulse response characteristics and an output variation are made possible.

7 Claims, 17 Drawing Figures

INVENTOR.
TETSUSABURO IKEDA

INVENTOR.
TETSUSABURO IKEDA

INVENTOR.
TETSUSABURO IKEDA

PULSE RESPONSE-DRIVING APPARATUS

FIELD OF THE INVENTION

This invention relates generally to a pulse response-driving apparatus and more particularly to a pulse-responsive drive suitable for a mechanical curve indication apparatus, i.e., X-Y plotter.

The X-Y plotter is an apparatus to draw graphs or drawings by the use of pen on the recording sheet. This apparatus generally provides a drum movable to the Y axis direction through rotation and a pen linearly movable in the X axis direction. In this apparatus, the drum and the pen selectively move respectively in accordance with a pulse signal to plot on the recording sheet of the drum.

For an apparatus such as an X-Y plotter or a numerical control apparatus, a pulse-responsive drive apparatus having a sensitive response characteristic, i.e., fast response speeds has been claimed. In recent years, therefore, improvements in response characteristic of a pulse-responsive device apparatus, for example pulse motor or servo motor, have been effected but the one having a satisfying response characteristic has yet to be obtained.

The conventional pulse-responsive drive apparatus is so made that displacement is carried out at a rate of one step for a pulse and, therefore, the displacement for a pulse is unchangeable.

SUMMARY AND OBJECTS OF THE INVENTION

It is a main object of this invention to provide a pulse-responsive drive apparatus having sensitive response characteristic, i.e., increased response speeds, and, more particularly, an apparatus having its starting characteristic substantially doubled.

It is another object of this invention is to provide a pulse-responsive drive apparatus that can change the displacement for a pulse.

In accordance with an aspect of this invention, the pulse-responsive drive apparatus comprises plural electro-mechanical energy converters responsive to pulse signals, for example common or mutually different pulse signals, and a combined power transmission mechanism with its inputs being the composite of respective mechanical outputs of said electro-mechanical energy converters, whereby an improvement of pulse response characteristic and output variations are made possible.

In accordance with a feature of this invention, the pulse-responsive drive apparatus comprises a first electro-mechanical energy converter responsive to a first pulsating signal, a second electro-mechanical energy converter responsive to a second pulse signal, and a combined power transmission mechanism with its inputs being the respective mechanical outputs and its output being the composite of said two mechanical outputs of said first and second electro-mechanical energy converters, whereby a mechanical output in accordance with the composite of first and second pulsating signals is obtained from said combined power transmission mechanism.

The invention will be described in more detail by way of example with reference to the accompanying drawings.

DESCRIPTION OF THE PREFERRED EMBODIMENTS

Figure 1:
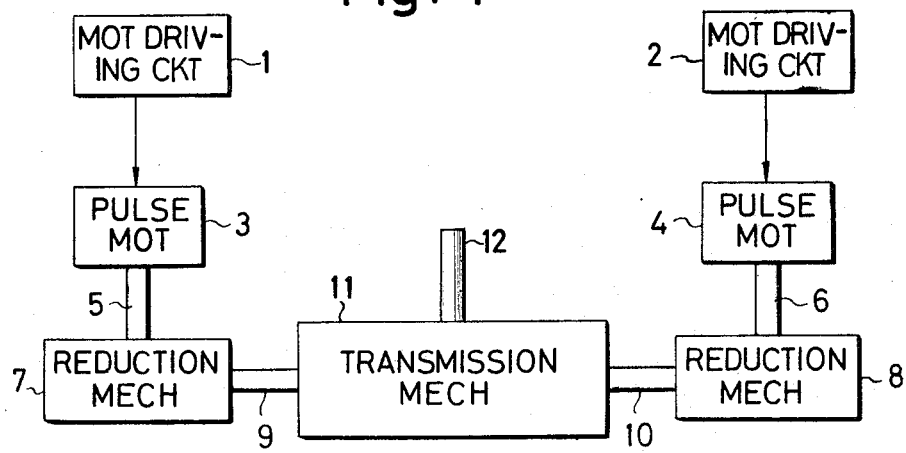
FIG. 1 is a block diagram of one embodiment of a pulse-responsive drive apparatus in accordance with this invention.

In FIG. 1, the pulse-responsive drive apparatus consists of a pair of motor driving circuits 1 and 2 which produce pulsating signals, a pair of pulse motors 3 and 4, output axes 5 and 6 of the pulse motors 3 and 4, a pair of reduction mechanisms 7 and 8, a pair of input axes 9 and 10 to transmit respective outputs of said reduction mechanisms to combined power transmission mechanism 11, and an output axis 12 of said mechanism. To explain each block in order, the motor driving circuits 1 and 2 are the circuits giving electric pulsating signals to the respective pulse motors 3 and 4 in accordance with control signals and comprise a control signal transfer circuit, a pulse generator, a pulse distributer and etc.

The pulse motors 3 and 4 are servo motors rotating merely a predetermined angle on each input pulse signal and are sometimes termed step motors. In this embodiment, therefore, these pulse motors 3 and 4 rotate at a predetermined angle by the pulse signals from the respective motor driving circuits 1 and 2 and transmit their rotational displacement or mechanical output to the respective output axes 5 and 6.

The reduction mechanisms 7 and 8 shorten rotational displacement of the respective output axes 5 and 6 to transmit to respective the input axes 9 and 10.

Figure 2:
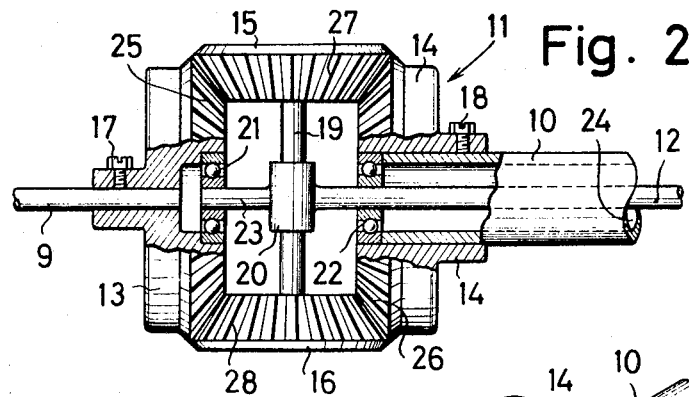
FIG. 2 is a sectional view of a combined power transmission mechanism shown in FIG. 1.

The combined power transmission mechanism 11 is so arranged that composite of a pair of mechanical inputs represented respectively by the input axes 9 and 10 is obtained from the output axis 12. FIG. 2 illustrates an example of said combined power transmission mechanism. In the combined power transmission mechanism 11, a bevel gear 13 having teeth 25 is fixed on the input axis 9 by a screw 17 while a bevel gear 14 having teeth 26 whose number of teeth is as same as teeth 25 is fixed on the other input axis 10 by a screw 18. These two bevel gears 13 and 14 are respectively engaged with a bevel gear 15 having teeth 27 and a bevel gear 16 having teeth 28 where the number of teeth 28 is the same as the number of teeth 27. Said bevel gears 15 and 16 are respectively fixed on both ends of a shaft 19.

The output axis 12 falling at right angles with the shaft 19 is connected to the center portion of the shaft 19 by means of a connecting member 20. The output axis 12 is put in a hollow portion 24 of input axis 10 coaxially and pivotably supported by a bearing 22 fixed on one end of the input axis 10. The supporting axis 23 arranged in line with the output axis 12 and fixed with the connecting member 20 on one end is supported by a bearing 21 fixed on bevel gear 13.

Next, function of the pulse-responsive drive apparatus will be given.

The pulse motor 3 makes a step-rotation at a predetermined angle in accordance with pulse signal from one motor driving circuit 1. This step-rotation, after reducing its speed by the reduction mechanism 7, is transmitted to the bevel gear 13 of the combined power transmission mechanism 11 from the input axis 9. The bevel gear 13 given rotation by said input axis 9 rotates. Following this rotation, 2 bevel gears 15 and 16 that engage with the bevel gear 13 rotate. In this case, as the bevel gear 14 is in a state of suspension, the rotation of the bevel gears 15 and 16 centers on the connecting member 20 or rather the axes 12 and 23. By rotation given by the bevel gears 15 and 16, the output axis 12 rotates and a displacement of the same direction as the input axis 9 is obtained from the output axis 12. This rotational displacement against that of the axis 9 is determined by the ratio of the number of teeth of bevel gear 13 and the number of teeth of the bevel gears 15 and 16. When the pulse motor 4 is given pulse signal by the motor driving circuit 2, the pulse motor 4 starts rotation which is transmitted to input axis 10 through the reduction mechanism 8. Following the rotation of input axis 10 the bevel gear 14 rotates and the bevel gears 15 and 16 also rotate. And, as in the aforesaid case, the output axis 12 rotates.

Figure 3:
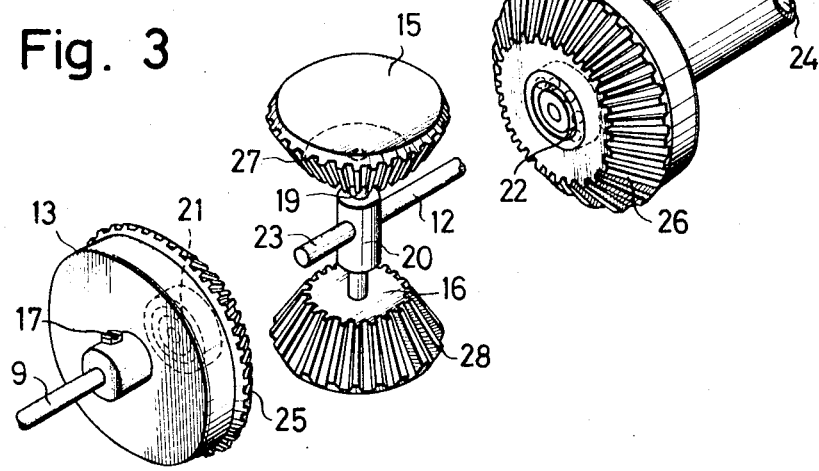
FIG. 3 is a perspective view detached from each part of bevel gear mechanism of combined power transmission mechanism shown in FIG. 2.

Up to now 2 driving systems of input axes 9 and 10 have been described separately. Even if these two driving systems work at the same time, the same performance is carried on. This performance will be explained with reference to FIGS. 4A – 6C. In these drawings the combined power transmission mechanism illustrated in FIGS. 2 and 3 is shown in principle and the bevel gear 13 corresponds to a rack 113, the bevel gear 14 a rack 114 while the bevel gears 15 and 16 correspond to a spur gear 115 respectively.

Figure 4A:
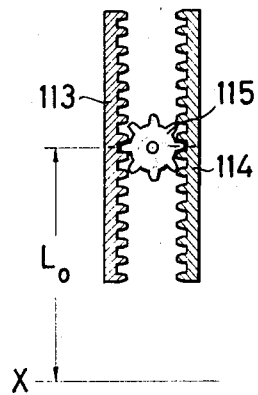
FIGS. 4A and 4B, FIGS. 5A and 5B and FIGS. 6A – 6C are summarized plan views of gear and rack mechanism to help explain the function of combined power transmission mechanism shown in FIGS. 2 and 3.
Figure 4B:
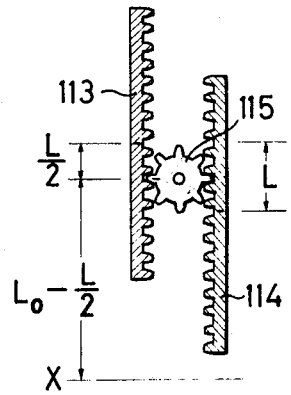

FIGS. 4A and 4B show a state when merely one rack was moved. As illustrated in FIG. 4A, when the spur gear 115 is arranged on a point at a distance $L_o$ from standard line X, the rack 113 is fixed and the rack 114 is moved for a length L downward in FIG. 4A, the spur gear 115 makes a displacement of distance L/2. Namely, the spur gear 115 moves to a point with distance of $L_o - L/2$ from the standard line X. Now explanation has been given by the use of the racks 113 and 114 the spur gear 115 and same performance can be observed in the bevel gear mechanism consisting of the bevel gears 13, 14, 15 and 16. Namely, as in the same principle as this, the rotating angle of the output axis 12 of the combined power transmission mechanism makes a displacement.

Figure 5A:
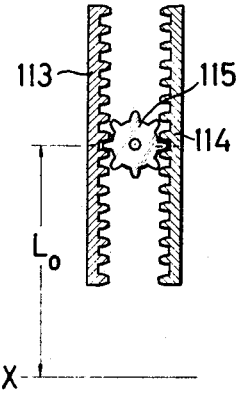
Figure 5B:
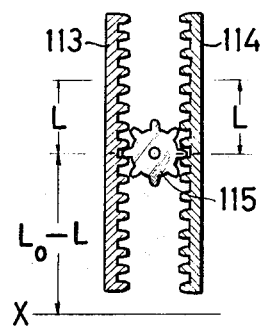

FIGS. 5A and 5B show a state when both racks 113 and 114 were moved at the same time. As in the case of FIG. 4A, FIG. 5A indicates a state when the spur gear 115 is arranged on a point with distance $L_o$ from the standard line X. When both racks 113 and 114 are moved downward in FIG. 5A for a length L respectively, the spur gear 115 makes a displacement for a length L as shown in FIG. 5B. Namely, the spur gear 115 moves to a point with distance $L_o - L$ from the standard line X.

Figure 6A:
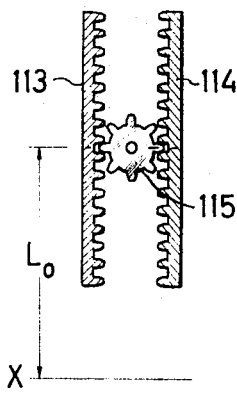
Figure 6B:
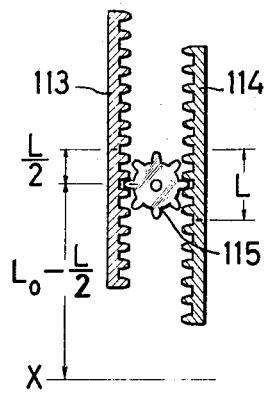
Figure 6C:
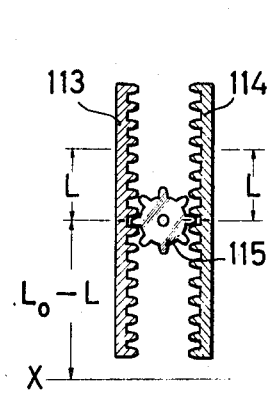

FIGS. 6A – 6C indicate a state when both racks were moved individually. As in the case of FIGS. 4A and 5A, FIG. 6A shows a state when the spur gear 115 is arranged on a point with distance $L_o$ from the standard line X. In this state when the rack 113 is fixed and the rack 114 is moved downward in FIG. 6A for a distance L, the spur gear 115 moves for a length L/2 as shown in FIG. 6B. Namely, the spur gear 115 moves to a point with distance $L_o - L/2$ from the standard line X. Then, when the rack 114 is fixed and the rack 113 is moved downward in FIG. 6B for a length L, the spur gear 115 makes a displacement of distance L/2. Namely, by merely moving the racks 113 and 114 in the same direction individually for a length L, the spur gear 115 moves to a point with distance $L_o - L$ from the standard line X. If the racks 113 and 114 move in the opposite direction each other, the spur gear 115 will be given a displacement in a reverse direction.

On the basis of the foregoing principle, the combined power transmission mechanism 11 works. Therefore, after connecting the output axis 12 with X or Y axis of X – Y plotter, one train of control signals is distributed to be given to two motor driving circuits 1 and 2, or two individual trains of control signals are given to the respective motor driving circuits 1 and 2. By so doing, the total of displacement caused by pulse of the motor driving circuit 1 and that caused by pulse of the motor driving circuit 2 can be obtained on said X or Y axis. This apparatus therefore enables to change the displacement of output axis 12 in accordance with the number of pulses of the control signal, and when one control signal is distributed into two sets of pulses to drive the respective pulse motors 3 and 4, the starting characteristic is improved substantially two-fold.

In this embodiment two motor driving circuits 1 and 2 are employed but one motor driving circuit will also do. In this case, a single pulse signal from the motor driving circuit can be respectively applied to two pulse motors 3 and 4.

Next, description will be made as to another pulse response-driving apparatus of this invention with reference to FIG. 7. A waveform shaping circuit 32 is connected with a input terminal 31 of control signal. The waveform shaping circuit 32 is connected with a pulse distributor 51 consisting of a flip-flop circuit 34 and AND circuits 35 and 36. In the following stage, a line 39 relaying a first pulse to a pulse motor 45 through a ring circuit 41 and an amplifier 43. Also, a line 40 relays a second pulse to a pulse motor 46 through a ring circuit 42 and an amplifier 44. An output axis of the pulse motor 45 is connected with an input axis 47 of a combined power transmission mechanism 49 while a output axis of the pulse motor 46 is connected with an input axis 48 of the combined power transmission mechanism 49. The combined power transmission mechanism 49 is constituted to obtain a mechanical output, representing a composite of the mechanical input from the two axes input 47 and 48, from output axis 50. Namely, the combined power transmission mechanism 49 is constituted on the same principle as shown in FIG. 2.

Performance of said pulse response-driving apparatus shown in FIG. 7 will be explained with reference to FIGS. 8A – 8F.

Figure 8A:
FIGS. 8A – 8F are pulse signal waveforms obtained at various points in the pulse-responsive drive apparatus shown in FIG. 7.

A control signal consisting of a train of pulse, as shown in FIG. 8A, is applied to waveform shaping circuit 32 by the input terminal 31. The waveform shaping circuit 32 is made up either by a shaping circuit using a diode or a monostable multivibrator. The shaping circuit 32 is to shape the pulses as shown in FIG. 8A to a train of single-level pulses as shown in FIG. 8B.

Figure 8B:

The pulses shown in FIG. 8B formed by said waveform shaping circuit 32 is applied to the flip-flop circuit 34 and the AND circuits 35 and 36 through the line 33 respectively.

Figure 8C:

The flip-flop circuit 34 repeats inversion on each pulses shown in FIG. 8B and relays the signal to two output lines 37 and 38 alternately. Namely, the line 37 relays pulses as shown in FIG. 8C while the line 38 relays pulses as shown in FIG. 8E respectively.

The AND circuit 35 works after being applied pulses (FIG. 8B) on line 33 and that (FIG. 8C) of line 37 respectively. When the trains of pulses of both lines exist at the same time, the AND circuit 35 will generate a train of pulses shown in FIG. 8D. The AND circuit 36 works after being applied pulses (FIG. 8B) of line 33 and that (FIG. 8E) of line 38 respectively. When the trains of pulses of both lines exist at the same time, the AND circuit 36 will generate a train of pulses shown in FIG. 8F.

Figure 8D:
Figure 8E:
Figure 8F:
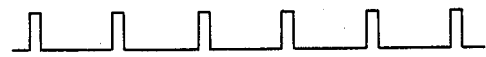

The train of pulses in FIG. 8D and same in FIG. 8F, as may be easily understood when compared with the train of pulses in FIG. 8B, represent the train of pulse signal in FIG. 8B alternately distributed.

Pulses distributed as above are applied to the ring circuit 41 through the line 39 and the ring circuit 42 through the line 40 respectively.

The ring circuits 41 and 42 are to apply pulses to respective phases of pulse motors 45 and 46 respectively and therefore work as distributors.

The output of the ring circuit 41 is applied to the pulse motor 45 after being amplified by the amplifier 43. Also, the output of ring circuit 42 is applied to the pulse motor 46 after being amplified by the amplifier 44.

The pulse motor 45 is driven in accordance with pulses in FIG. 8D. Also, the pulse motor 46 is driven in accordance with a train of pulses in FIG. 8F. And, a pair of mechanical outputs are relayed to the combined power transmission mechanism 49 respectively from respective output axes of two 2 pulse motors 45 and 46 and a composite of said mechanical output is obtained from the output axis 50.

Figure 7:
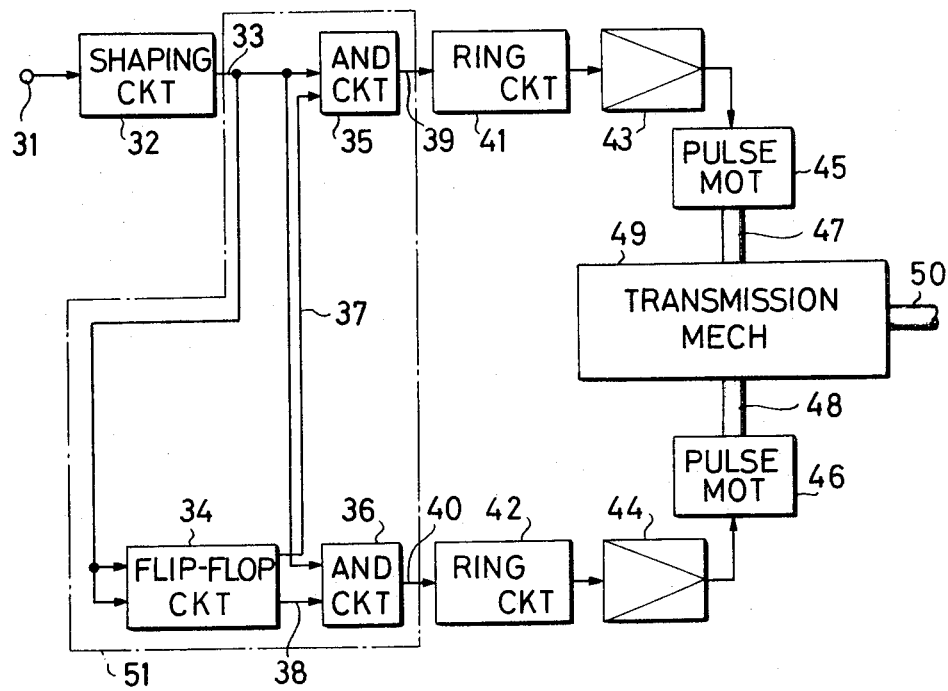
FIG. 7 is a block diagram of another embodiment of a pulse-responsive drive apparatus in accordance with this invention.

According to pulse-responsive drive apparatus shown in FIG. 7, in order to obtain a step displacement from output axis 50 in accordance with the number of pulse of the input control signal, the respective pulse motors 45 and 46 just do a half step work. In other words, the starting characteristic of this pulse-responsive drive apparatus gets substantially doubled as compared with that of conventional pulse-responsive drive apparatus.

Although the illustrative embodiments of this invention have been described in detail above with reference to the accompanying drawings, it is to be understood that this invention is not limited to these precise embodiments and that various changes and modifications may be effected therein by one skilled in art without departing from the scope or spirit of the invention.

What is claimed is:

1. A pulse-responsive drive apparatus comprising:
electrical control circuit means for generating control pulses,
a first electro-mechanical energy converter coupled to said control circuit means and responsive to control pulses therefrom,
a second electro-mechanical energy converter coupled to said control circuit means and responsive to control pulses therefrom, and
a combined power transmission mechanism comprising a first input means mechanically coupled to the output of said first electro-mechanical energy converter, a second input means coupled to the output of said second electro-mechanical energy converter, and gear means for transmitting to an output means a composite value of the mechanical inputs applied to said first input means and said second input means whereby a mechanical output is obtained representing a composite of pulses applied to said first electro-mechanical energy converter and said second electro-mechanical energy converter.

2. The pulse-responsive drive apparatus according to claim 1 wherein said first electro-mechanical energy converter is responsive to a first set of control pulses and said second electro-mechanical energy converter is responsive to a second set of control pulses.

3. The pulse-responsive drive apparatus according to claim 2 wherein said electrical signal circuit includes a pulse distributor for distributing a first set of pulses to said first electro-mechanical energy converter and a second set of pulses to said second electro-mechanical energy converter.

4. The pulse-responsive drive apparatus according to claim 3 wherein said pulse distributor comprises a source for a train of pulses, a flip-flop circuit changing state in response to each pulse supplied by said source, a first AND circuit responsive to one output of said flip-flop circuit and a pulse from said source, a second AND circuit responsive to another output of said flip-flop circuit and a pulse from said source, a first circuit supplying an output pulse of said first AND circuit to said first electro-mechanical energy converter and a second circuit supplying an output pulse of said second AND circuit to said second electro-mechanical energy converter.

5. The pulse-responsive drive apparatus according to claim 1 wherein said first and said second electro-mechanical energy converters comprise pulse motors having rotatable output means, said rotatable output means rotating a predetermined angle in response to a predetermined number of control pulses and transmitting rotational motion thereof to said first and said second input means of said combined power transmission mechanism.

6. The pulse-responsive drive apparatus according to claim 1 further comprising a first reduction mechanism coupling said first electro-mechanical energy converter to said combined power transmission mechanism and a second reduction mechanism coupling said second electro-mechanical energy converter to said combined power transmission mechanism.

7. The pulse-responsive drive apparatus according to claim 1 wherein said combined power transmission mechanism comprises a first bevel gear mounted on a first input axis, a second bevel gear mounted on a second input axis, said first input axis and said second input axis being coaxial, third and fourth bevel gears mounted on a common axis extending at right angles with respect to the axes of said first input axis and said second input axis, said third and fourth bevel gears engaging said first and said second bevel gears respectively, and an output axis coupled to said third and fourth bevel gears.

* * * * *